United States Patent
Fischer et al.

(10) Patent No.: US 7,462,030 B2
(45) Date of Patent: Dec. 9, 2008

(54) NOZZLE HAVING A NOZZLE BODY WITH HEATED AND UNHEATED NOZZLE BODY SEGMENTS

(75) Inventors: Jonathon Fischer, Oakville (CA); Fabrice Fairy, Georgetown (CA); Gino Colonico, Georgetown (CA); Payman Tabassi, Rockwood (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 622 days.

(21) Appl. No.: 11/100,506

(22) Filed: Apr. 7, 2005

(65) Prior Publication Data

US 2005/0226956 A1 Oct. 13, 2005

Related U.S. Application Data

(60) Provisional application No. 60/559,977, filed on Apr. 7, 2004, provisional application No. 60/618,996, filed on Oct. 18, 2004.

(51) Int. Cl.
*B29C 45/20* (2006.01)

(52) U.S. Cl. ........................ 425/549; 425/572

(58) Field of Classification Search .......... 425/549, 425/572
See application file for complete search history.

(56) References Cited

U.S. PATENT DOCUMENTS

| | | |
|---|---|---|
| 3,812,323 A | 5/1974 | Pink |
| 3,843,295 A | 10/1974 | Greenberg et al. |
| 4,230,934 A | 10/1980 | ter Beek et al. |
| 4,517,453 A | 5/1985 | Tsutsumi |
| 4,576,567 A * | 3/1986 | Gellert ................ 425/549 |
| 4,678,426 A | 7/1987 | Stauber |
| 4,818,217 A * | 4/1989 | Schmidt et al. ........ 425/549 |
| 4,836,766 A | 6/1989 | Gellert |
| 4,875,848 A | 10/1989 | Gellert |
| 4,892,474 A | 1/1990 | Gellert |
| 4,899,288 A | 2/1990 | Tsutsumi |
| 4,902,218 A | 2/1990 | Leonard et al. |

(Continued)

FOREIGN PATENT DOCUMENTS

AU 452137 3/1973

(Continued)

OTHER PUBLICATIONS

PSG Brochure.

(Continued)

*Primary Examiner*—Tim Heitbrink
(74) *Attorney, Agent, or Firm*—Medler Ferro PLLC

(57) ABSTRACT

A nozzle for an injection molding apparatus includes a nozzle body having a first nozzle body segment, a second nozzle body segment and a third nozzle body segment. The second nozzle body segment is removably connected to at least one of the first nozzle body segment and the third nozzle body segment. The first nozzle body segment and the third nozzle body segment are heated either by first and second nozzle heaters, respectively, or by a heater sleeve having a cut-out along the length of the second nozzle body segment. The second nozzle body segment is substantially devoid of a nozzle heater such that the second nozzle body segment is heated passively through contact with the first nozzle body segment and the third nozzle body segment.

36 Claims, 15 Drawing Sheets

U.S. PATENT DOCUMENTS

| | | | |
|---|---|---|---|
| 4,945,630 | A | 8/1990 | Gellert |
| 5,046,942 | A | 9/1991 | Gellert |
| 5,051,086 | A | 9/1991 | Gellert |
| 5,061,174 | A | 10/1991 | Gellert |
| 5,125,827 | A | 6/1992 | Gellert |
| 5,135,377 | A | 8/1992 | Gellert |
| 5,225,211 | A | 7/1993 | Imaida et al. |
| 5,232,710 | A | 8/1993 | Miyazawa et al. |
| 5,320,513 | A * | 6/1994 | Schmidt ............... 425/143 |
| 5,507,637 | A | 4/1996 | Schad et al. |
| 5,518,389 | A | 5/1996 | Nonomura et al. |
| 5,871,786 | A | 2/1999 | Hume et al. |
| 6,095,790 | A | 8/2000 | Gellert et al. |
| 6,230,384 | B1 | 5/2001 | Gellert et al. |
| 6,305,923 | B1 | 10/2001 | Godwin et al. |
| 6,447,283 | B1 | 9/2002 | Gellert |
| 6,712,597 | B1 | 3/2004 | Van Boekel |
| 7,137,806 | B2 | 11/2006 | Babin et al. |
| 2005/0100625 | A1 | 5/2005 | Tooman et al. |
| 2005/0225000 | A1 | 10/2005 | Tabassi |

FOREIGN PATENT DOCUMENTS

| | | |
|---|---|---|
| DE | 86 20 956 U1 | 1/1987 |
| DE | 40 05 437 C2 | 5/1992 |
| DE | 43 24 027 | 1/1995 |
| DE | 44 04 894 C1 | 1/1995 |
| DE | 10333206 A1 | 4/2004 |
| EP | 0 438 739 A1 | 7/1991 |
| EP | 0 438 739 B1 | 7/1991 |
| EP | 0 443 203 A2 | 8/1991 |
| EP | 0 443 203 A3 | 8/1991 |
| EP | 0 443 203 B1 | 8/1991 |
| EP | 0 835 176 B1 | 4/1998 |
| EP | 0995 574 A1 | 4/2000 |
| EP | 0995 574 B1 | 4/2000 |
| EP | 1 148 985 | 10/2001 |
| EP | 1 466 715 A1 | 10/2004 |
| JP | 63202418 A | 2/1987 |
| KR | 10-2006-0032979 | 4/2006 |
| WO | WO 00/46008 | 8/2000 |
| WO | WO 01/15884 | 3/2001 |

OTHER PUBLICATIONS

European Search Report dated Jul. 7, 2005 EP 05 00 7655.
European Search Report for European Application No. EP 04 03 0354, European Patent Office, The Hague, mailed on Jul. 4, 2005.
European Search Report for European Application No. EP 05 00 7655, European Patent Office, The Hague, mailed on Jul. 7, 2005.

* cited by examiner

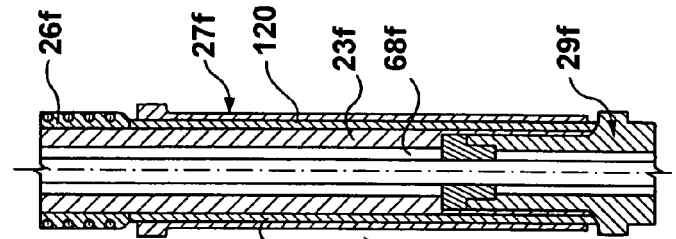
FIG. 7
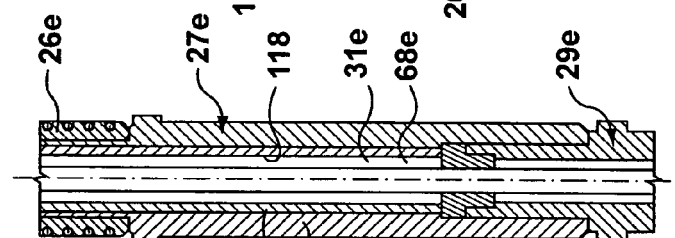
FIG. 6
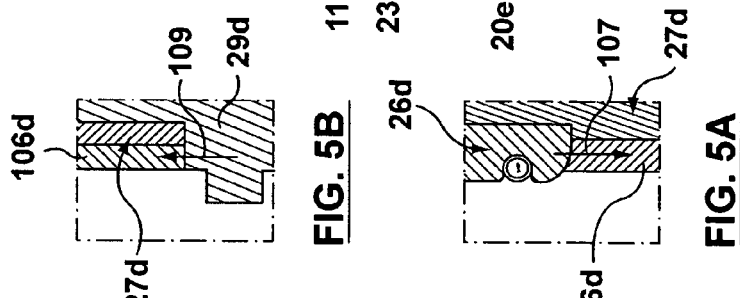
FIG. 5B    FIG. 5A    FIG. 5
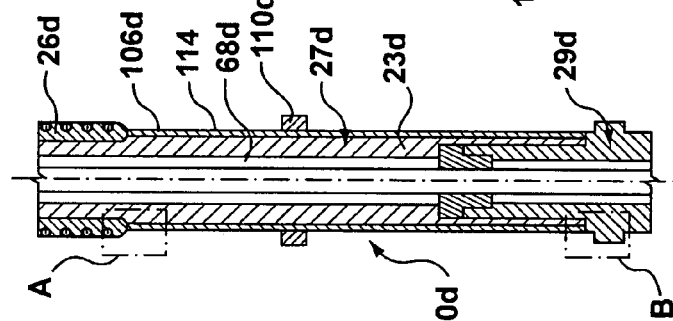
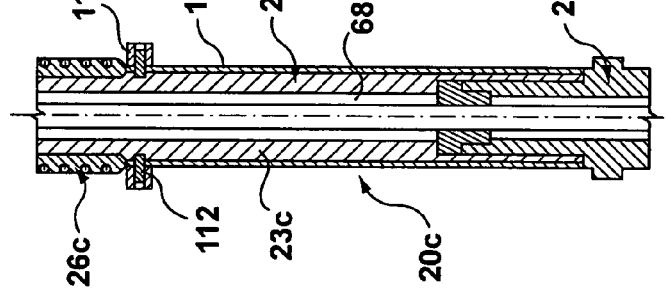
FIG. 4

NOZZLE HAVING A NOZZLE BODY WITH HEATED AND UNHEATED NOZZLE BODY SEGMENTS

CROSS-REFERENCE TO RELATED APPLICATIONS

This application claims the benefit of U.S. provisional patent applications 60/559,977, filed Apr. 7, 2004, and 60/618,996, filed Oct. 18, 2004, which are hereby incorporated by reference in their entirety herein.

BACKGROUND OF THE INVENTION

1. Field of the Invention

The present invention relates generally to an injection molding apparatus and, in particular to a nozzle having a nozzle body with multiple nozzle body segments. More particularly, the present invention relates to an injection nozzle in which at least one of the nozzle body segments of the nozzle body is heaterless.

2. Background of the Invention

As is well known in the art, hot runner injection molding systems include a manifold for conveying pressurized melt from an inlet to one or more manifold outlets. A plurality of nozzles are typically coupled to the manifold outlets for conveying the melt to a plurality of mold cavities.

In some applications, such as molding of large automotive parts, it is necessary to use nozzles having different lengths, where the nozzles communicate with a single manifold. For example, when one is injecting a molten material into a mold cavity having an uneven surface facing the injection nozzles, then one of the nozzles has to be longer than the other to reach the mold cavity. In another example, when one is injecting a molten material simultaneously into separate mold cavities located in the same mold and having different heights or depths with respect to the tip portions of the nozzles, nozzles of different lengths are required. Such molds, often referred to as family molds, provide means to mold articles of different shapes at the same time using the same or different resins or metals.

To vary the length of the nozzles, one can use single body nozzles of different lengths, or one can use a combination of nozzles having a single nozzle body and nozzles having a nozzle body made of two nozzle body segments. In the later case, a single nozzle body segment can be connected with another nozzle body segment to vary the overall length of the nozzle body and thereby the overall length of the entire nozzle.

To maintain the temperature of the melt as it travels through the melt channel of the nozzle, one can use either a single heater or multiple heaters. In either case, in many instances, there is more heat lost at the ends of the nozzle adjacent the manifold and mold gate than in the mid-section. The mid-section of the nozzle does not contact any part of the manifold or mold plate and, therefore, does not lose heat as quickly as at the ends. In long nozzles that are heated by a single heater, the mid-section retains heat more efficiently than the end portions. As a result, the temperature of the nozzle mid-section is often difficult to regulate if a single heater is used along the nozzle or melt channel. Thus, the temperature of the melt along the mid-section of the nozzle is higher than at the ends. This uneven heat profile is difficult to correct or control.

The uneven heat profile along the melt channel is undesirable because any variation in the temperature of the melt as it flows through the injection molding apparatus can adversely affect the quality of the molded products. The uneven heat distribution along the nozzle and melt channel is often exaggerated when longer nozzles, including nozzles having a nozzle body comprised of two nozzle body segments, are used.

In order to compensate for the uneven heat distribution along the length of the nozzle, a conventional nozzle heater is used. The nozzle heater includes a heating element that is wound around the nozzle body. The pitch of the heating element is typically smaller near the nozzle head and nozzle tip and larger along the nozzle mid-section in order to compensate for the uneven heat loss experienced by the nozzle. A disadvantage of this arrangement is there is often a temperature spike at the mid-section of the nozzle because these conventional heater still applies heat along the entire length of the nozzle and the heat loss from the mid-section is negligible compared to the heat loss from the ends of the nozzle.

There is a need to provide a way to mold parts having uneven surfaces or to simultaneously mold various parts having different shapes in a single mold by using injection nozzles of variable length. There is also a need to better control and correct the heat profile along variable length nozzles. There is also a need to manufacture injection nozzles in various lengths in a faster and more efficient manner, while still being able to easily customize the length of the nozzle, or to manufacture and assemble the injection nozzles in different remote locations.

SUMMARY OF THE INVENTION

The present invention provides an injection molding apparatus including a manifold having a manifold channel and a nozzle. The nozzle has a first or upstream end adjacent the manifold and a second or downstream end adjacent a mold gate. The nozzle has a nozzle body made of at least three interlocked nozzle body segments. One nozzle body segment is adjacent the first end of the nozzle and another nozzle body segment is adjacent the second end of the nozzle. At least one intermediate nozzle body segment is disposed between the other two nozzle body segments. The nozzle body segments adjacent the first and second ends of the nozzle each have a nozzle heater in contact with them. These nozzle heaters directly heat their respective nozzle body segments. The intermediate nozzle body segment, however, is heaterless or substantially devoid of any heater. As such, the intermediate nozzle body segment is heated substantially indirectly or passively through heat transfer from the adjacent nozzle body segments.

The intermediate nozzle body segment is interlocked or connected to the other two nozzle body segments by a threaded engagement, brazing, welding, fusing, a press fit engagement or an interference fit engagement. In one embodiment, the intermediate nozzle body segment can be removably attached to the other two nozzle body segments, so that intermediate nozzle body segments of varying lengths can be used depending on the particular part to be molded. The intermediate nozzle body segment is made of a thermally conductive material. Depending on each particular application, the material of the intermediate nozzle body segment can have either a higher, an equal or a slightly lower thermal conductivity than the material of the other two nozzle body segments. Further, the intermediate nozzle body segment can be covered at least partially by a thermally conductive layer, such as a sleeve or coating, made of a material having a higher thermal conductivity than the material of the intermediate nozzle body segment, such as brass, copper or copper alloy to improve or enhance the passive heat transfer along the intermediate nozzle body segment. An insulating layer, such as a ceramic coating, can be used over the thermally conductive layer. In another embodiment, the intermediate nozzle body segment incorporates rods or any other embedded or partially embedded structural elements made of materials having a higher thermal conductivity than of the nozzle body segment itself.

BRIEF DESCRIPTION OF THE FIGURES

Embodiments of the present invention will now be described more fully with reference to the accompanying drawings in which like reference numerals indicate similar structure.

FIG. 4 is a side sectional view of a portion of another embodiment of a nozzle having a nozzle body made of multiple nozzle body segments.

FIG. 5 is a side sectional view of a portion of yet another embodiment of a nozzle having a nozzle body made of multiple nozzle body segments.

FIGS. 5A and 5B show enlarged views of portions A and B of FIG. 5.

FIG. 6 is a side sectional view of a portion of another embodiment of a nozzle having a nozzle body made of multiple nozzle body segments.

FIG. 7 is a side sectional view of a portion of another embodiment of a nozzle having a nozzle body made of multiple nozzle body segments.

DETAILED DESCRIPTION OF THE INVENTION

Figure 1:
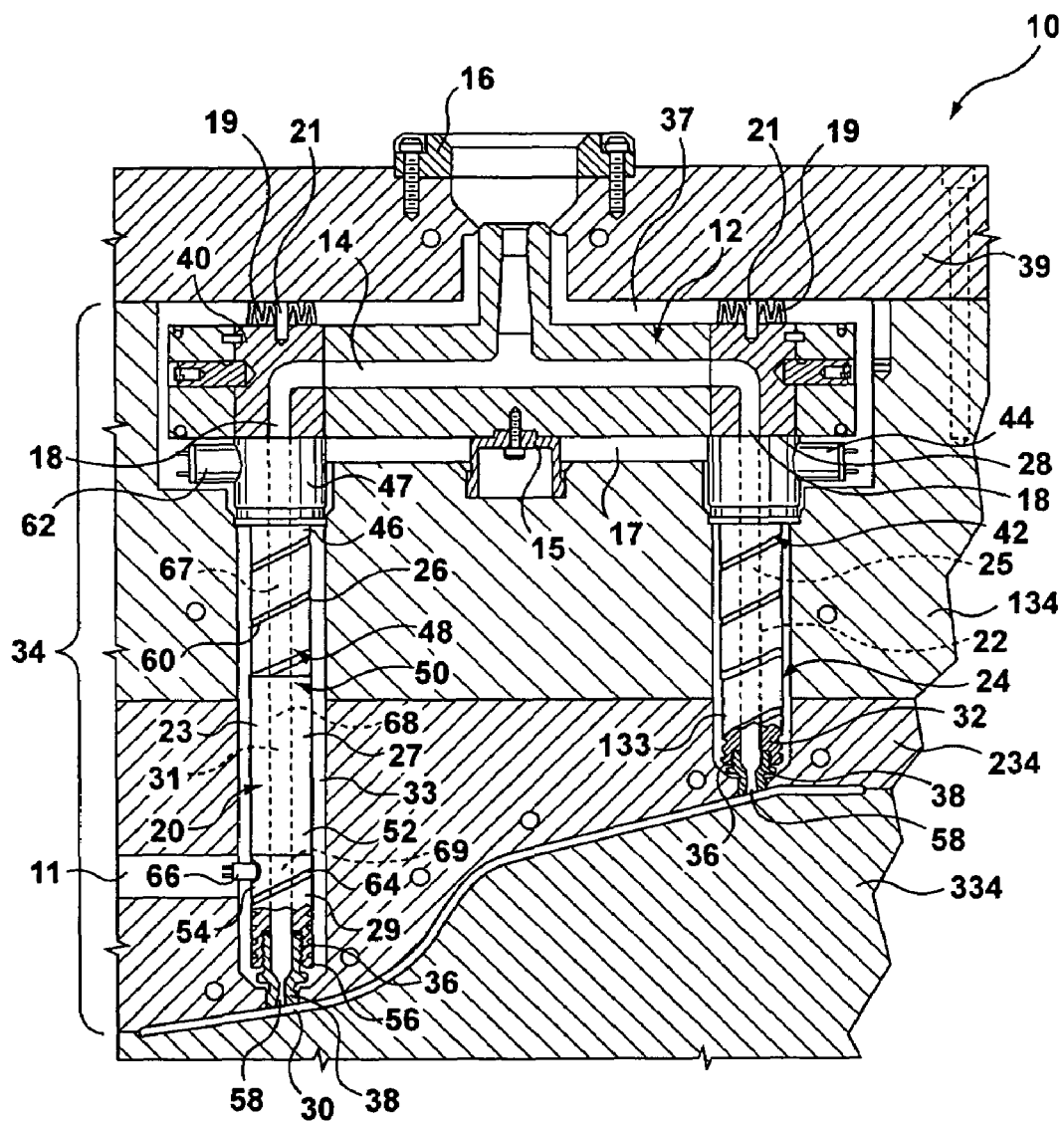
FIG. 1 is a side view partly in section of an injection molding apparatus having nozzles of various lengths with either a unitary nozzle body or a nozzle body made of multiple nozzle body segments.

Referring now to FIG. 1, an injection molding apparatus 10 is generally shown. The injection molding apparatus 10 includes a manifold 12 having a manifold channel 14 extending therethrough. A manifold bushing 16 is located at an inlet of the manifold channel 14 to receive a melt stream of moldable material from a machine nozzle (not shown) and to deliver the melt stream to manifold outlets 18. A heating element (not shown) heats manifold 12 to maintain the melt stream passing through manifold channel 14 at a desired temperature. The heating element of the manifold may be embedded into or otherwise surround a surface of the manifold 12. The manifold 12 is secured in position by a central locating ring 15 which bridges an insulative air space 17 between the heated manifold 12 and a cooled mold plate 134. Another insulative air space 37 of a predetermined width is located between the heated manifold 12 and a cooled clamp plate 39. Pressure discs 19 are mounted by screws 21 to create the insulative air space 37. Each pressure disc 19 can be made of a suitable high strength tool steel such as H13 or 420 Stainless and has a central opening therethrough to receive the screw 21. One example of such a pressure disc is shown in U.S. Pat. No. 5,125,827, which is incorporated herein by reference in its entirety. Other pressure discs or biasing elements could be used as would be apparent to one skilled in the relevant art.

FIG. 1 shows a first nozzle 20 and a second nozzle 24, each nozzle 20, 24 is located in an opening 33 formed in mold plates 134 and 234 of a split mold plate 34. The nozzles 20 and 24 are positioned between the manifold 12 and a respective mold cavity 30, which is defined by mold plates 234 and 334 of split mold plate 34. Nozzle 24 includes a single nozzle body 22 having an upstream nozzle end 28 and a downstream nozzle end 32. A nozzle channel 25 extends through nozzle 24 for delivering the melt stream from one manifold outlet 18 to the corresponding mold cavity 30 through a mold gate 58. Nozzle 24 is further provided with a single heater 42, which helps to maintain the melt stream at a desired temperature as it passes through nozzle 24. Heater 42 is powered through an electrical connector 44 that is in communication with a power source (not shown) external to injection molding apparatus 10. Nozzle 24 also includes a nozzle tip 38 that is retained in the downstream end 32 of nozzle 24 via a threaded connection 36 with nozzle body 22.

Nozzle 20 includes a nozzle body 23 made of three nozzle body segments: an upstream nozzle body segment 26, an intermediate nozzle body segment 27 and a downstream nozzle body segment 29, for delivering a melt stream from a manifold outlet 18 to mold cavity 30. Intermediate nozzle body segment 27 is disposed between the upstream nozzle body segment 26 and the downstream nozzle body segment 29 and is used to vary the length of nozzle body 23, and thereby nozzle 20. Intermediate nozzle body segment 27 is substantially devoid of a nozzle heater in direct contact with it. Upstream nozzle body segment 26 has an upstream melt channel 67, intermediate nozzle body segment 27 has an intermediate melt channel 68, and downstream nozzle body segment 29 has a downstream melt channel 69. These melt channels 67, 68 and 69 collectively define a nozzle channel 31, which is in fluid communication with the manifold channel 14 of the manifold 12. The mold cavity in communication with nozzle 20 may be a different section of the mold cavity 30, which receives melt via nozzle 24 or, alternatively, nozzle 24 may communicate with a separate mold cavity.

Upstream nozzle body segment 26 includes an upstream end 46 adjacent manifold 12. Upstream nozzle body segment 26 is in contact with and directly or actively heated by a nozzle heater 60, which is powered through an electrical connector 62.

In one embodiment, an upstream end 50 of intermediate nozzle body segment 27 is connected to a downstream end 48 of upstream nozzle body segment 26 by a threaded engagement (not shown), and a downstream end 52 of the intermediate nozzle body segment 27 is connected to an upstream end 54 of the downstream nozzle body segment 29 by a threaded engagement (not shown). In an alternate embodiment, intermediate nozzle body segment 27 can be connected to upstream nozzle body segment 26 and downstream nozzle body segment 29 by other means for connecting. For example, intermediate nozzle body segment 27 can be connected to upstream nozzle body segment 26 and downstream nozzle body segment 29 by a press fit engagement, an interference fit engagement, brazing, welding or fusing, as is known to one skilled in the relevant art. The means for connecting intermediate nozzle body segment 27 to upstream and downstream nozzle body segments 26, 29 is such that there is no relative movement, for example sliding movement, between the nozzle body segments. As such, during use, if one nozzle body segment moves due to thermal expansion, the other nozzle body segments connected thereto also move.

Both the manifold and the nozzle body segments will expand due to thermal expansion caused by heating during use. Pressure discs 19 are configured so that as the manifold expands during use, the pressure discs 19 bias the manifold 12 downwardly. Thus, pressure discs 19 maintain the predetermined width of insulative air space 37.

Similar to nozzle 20, the nozzle 24 also includes a nozzle tip 38 retained in a downstream end 56 of the downstream nozzle body segment 29. In one embodiment, the nozzle tip 38 is connected to downstream nozzle body segment 29 via a threaded connection 36. Downstream end 56 of downstream nozzle body segment 29 is located adjacent mold gate 58. As thermal expansion of the nozzles occur, each nozzle body expands downwardly, due to the biasing force of the pressure discs 19, so that the nozzle tips 38 are securely seated against mold gates 58. The downward force of manifold 12 due to thermal expansion and the biasing force of the pressure discs 19 also ensures a secure seal between manifold channel 14 and the nozzle melt channels 25 and 31.

Figure 2:
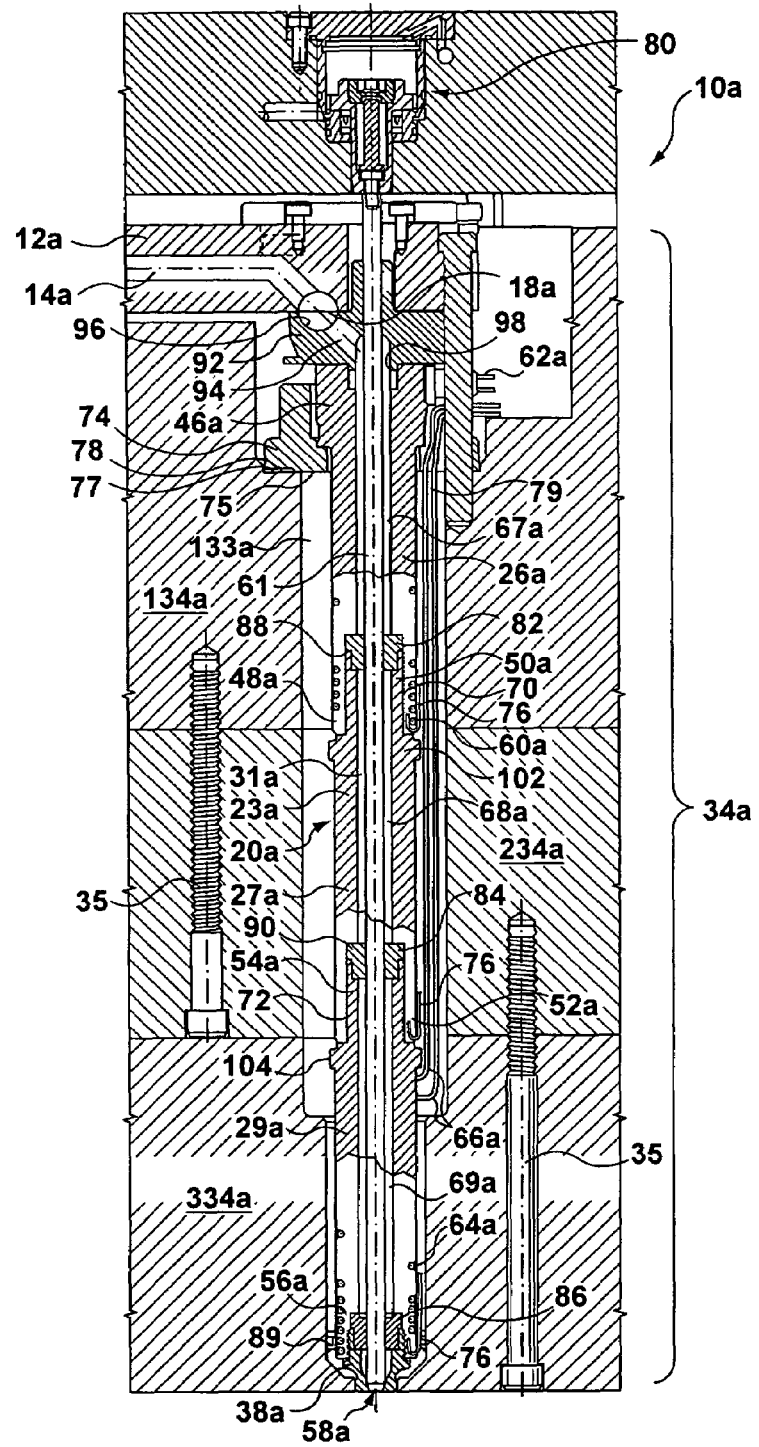
FIG. 2 is a side view partly in section of another embodiment of an injection molding apparatus of the present invention having a nozzle with a nozzle body made of multiple nozzle body segments.
Figure 3:
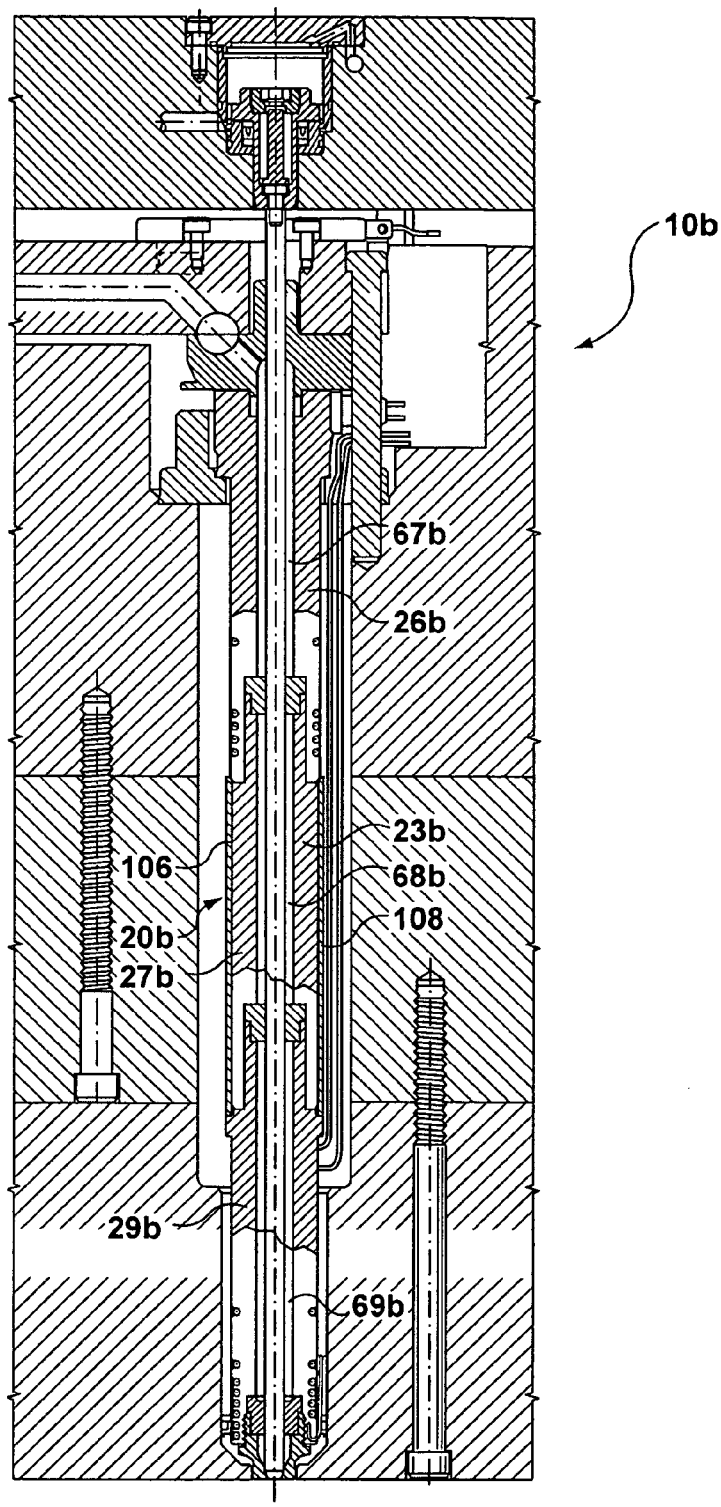
FIG. 3 is a side view partly in section of yet another embodiment of an injection molding apparatus of the present invention having a nozzle with a nozzle body made of multiple nozzle body segments.

Downstream nozzle body segment 29 is in contact with and directly or actively heated by a nozzle heater 64, which is powered through an electrical connector 66. Leads (not shown) for the electrical connector 66 may be drawn through a bore 11 through mold plate 234. Alternatively, leads from the electrical connector 66 may be drawn along the nozzle 20 through opening 133 to exit the injection molding apparatus 10 at the same location as leads (not shown) from the electrical connector 62. Such an arrangement is shown in FIGS. 2 and 3. As is apparent in FIG. 1, unlike the upstream and downstream nozzle body segments 26, 29, intermediate nozzle body segment 27 does not include a separate nozzle heater. That is, intermediate nozzle body segment 27 is not directly or actively heated by a separate nozzle heater. Rather, heat that may be transferred to intermediate nozzle body segment 27 is passed substantially indirectly through upstream and downstream nozzle body segments 26 and 29. As such, intermediate nozzle body segment 27 is heated substantially passively through heat transfer from upstream and downstream nozzle body segments 26 and 29.

In one embodiment, intermediate nozzle body segment 27 is made of a thermally conductive material. For example, intermediate nozzle body segment 27 can be made of any steel, such as die steel, mold steel or stainless steel, or Beryllium-Cooper, or by any other suitable thermally conductive material, as would be apparent to one skilled in the relevant art. In order for the intermediate nozzle body segment 27 to retain and provide the desired amount of heat to the molten material without having an active heater in contact with it, the intermediate nozzle body segment has to have a significant size with respect to the entire nozzle or with respect to the other nozzle body segments. The size of the intermediate nozzle body segment can be expressed in terms of either volume, mass or other equivalent parameters. Furthermore, the intermediate nozzle body segment has to have a surface contact area that closely matches the surface contact areas of the two other nozzle body segments. In one embodiment intermediate nozzle body segment 27 has a mass or volume that is at least 10% of the overall nozzle body mass or volume. Upstream nozzle body segment 26 and downstream nozzle body segment 29 are also made of thermally conductive materials, as discussed above. Intermediate nozzle body segment 27 can be made of a material having a thermal conductivity that is the same as, less than or greater than the thermal conductivity of the upstream nozzle body segment 26 and/or the downstream nozzle body segment 29.

The mold gates 58, which are provided at the entrance to the mold cavity 30, are selectively openable to permit delivery of melt to the mold cavities 30. The nozzles 20 and 24 may be thermal-gated or valve-gated.

Another embodiment of an injection molding apparatus 10a is shown in FIG. 2. The injection molding apparatus 10a includes a nozzle 20a that is coupled to an outlet 18a of a manifold 12a. Nozzle 20a includes a nozzle body 23a having an upstream nozzle body segment 26a, an intermediate nozzle body segment 27a and a downstream nozzle body segment 29a. The nozzle body segments 26a, 27a, 29a define a nozzle channel 31a, which is in fluid communication with a manifold channel 14a of the manifold 12a.

The injection molding apparatus 10a includes a split mold plate 34a, which is similar to the split mold plate 34 of FIG. 1, having separate mold plates 134a, 234a, and 334a. A mold cavity (not shown) is located downstream of plate 334 and receives melt from nozzle channel 31a, through mold gate 58a. The mold gate 58a is selectively openable by a valve pin 61, which extends through the nozzle channel 31a. The valve pin 61 is driven by an actuator 80. The actuator 80 may be pneumatic, hydraulic, electric or any suitable type of actuator.

Upstream nozzle body segment 26a has an upstream end 46a and a downstream end 48a. Downstream end 48a of upstream nozzle body segment 26a is connected to an upstream end 50a of intermediate nozzle body segment 27a by a threaded engagement 70. The connection of upstream nozzle body segment 26a to intermediate nozzle body segment 27a is such that a surface of downstream end 48a comes in contact with a surface of upstream end 50a to allow heat to be passed from heated upstream nozzle body segment 26a to intermediate nozzle body segment 27a. Downstream end 52a of intermediate nozzle body segment 27a is connected to an upstream end 54a of downstream nozzle body segment 29a by a threaded engagement 72. Similarly, the connection of intermediate nozzle body segment 27a to downstream nozzle body segment 29a is such that a surface of downstream end 52a comes in contact with a surface of upstream end 54a to allow heat to be passed from heated downstream nozzle body segment 29a to intermediate nozzle body segment 27a. Projections 102 and 104 are provided at the upstream ends 50a and 54a of intermediate nozzle body segment 27a and downstream nozzle body segment 29a, respectively. The projections 102, 104 are shaped to allow for engagement with a tool to facilitate connection and disconnection of the nozzle body segments 27a, 29a from the injection molding apparatus 10a.

Because of the length of an extended nozzle, such as nozzle 20a, a small misalignment of the valve pin 61 in an upstream area of nozzle 20a may skew the valve pin 61 so as to be greatly misaligned downstream at mold gate 58a. Thus, valve pin guides 82, 84 and 86 are provided along the length of the nozzle 20a. Valve pin guide 82 is received in a recess 88, which is formed by upstream nozzle body segment 26a and intermediate nozzle body segment 27a. The valve pin guide 82 is retained by the threaded connection 70 between the upstream and intermediate nozzle body segments 26a and 27a. Valve pin guide 84 is positioned similarly in a recess 90 between intermediate nozzle body segment 27a and downstream nozzle body segment 29a and is retained by threaded connection 72. Valve pin guide 86 is positioned and retained, between a nozzle tip 38a and a downstream end 56a of the downstream nozzle 29a. The downstream end 56a of downstream nozzle body segment 29a further includes a flange 89 which contacts mold plate 334a to align nozzle 20a with mold gate 58a.

Each of valve pin guides 82, 84 and 86 comprise one or more channels therein (not shown) to allow melt to flow past each of valve pin guides 82, 84 and 86, while maintaining the alignment of the valve pin 61 in the center of nozzle channel 31a and aligned with mold gate 58a. Suitable valve pin guides are disclosed in U.S. application Ser. No. 10/751,507 assigned to Mold-Masters Ltd., which is incorporated herein by reference in its entirety.

To further guide the valve pin 61 and keep it aligned with mold gate 58a, a pin support 92 is positioned between the upstream end 46a of upstream nozzle body segment 26a and manifold 12a. Pin support 92 includes a melt channel 94 which is aligned and in fluid communication with manifold channel 14a at an upstream end 96 of channel 94 and with nozzle channel 31a at a downstream end 98 of channel 94.

Figure 10:
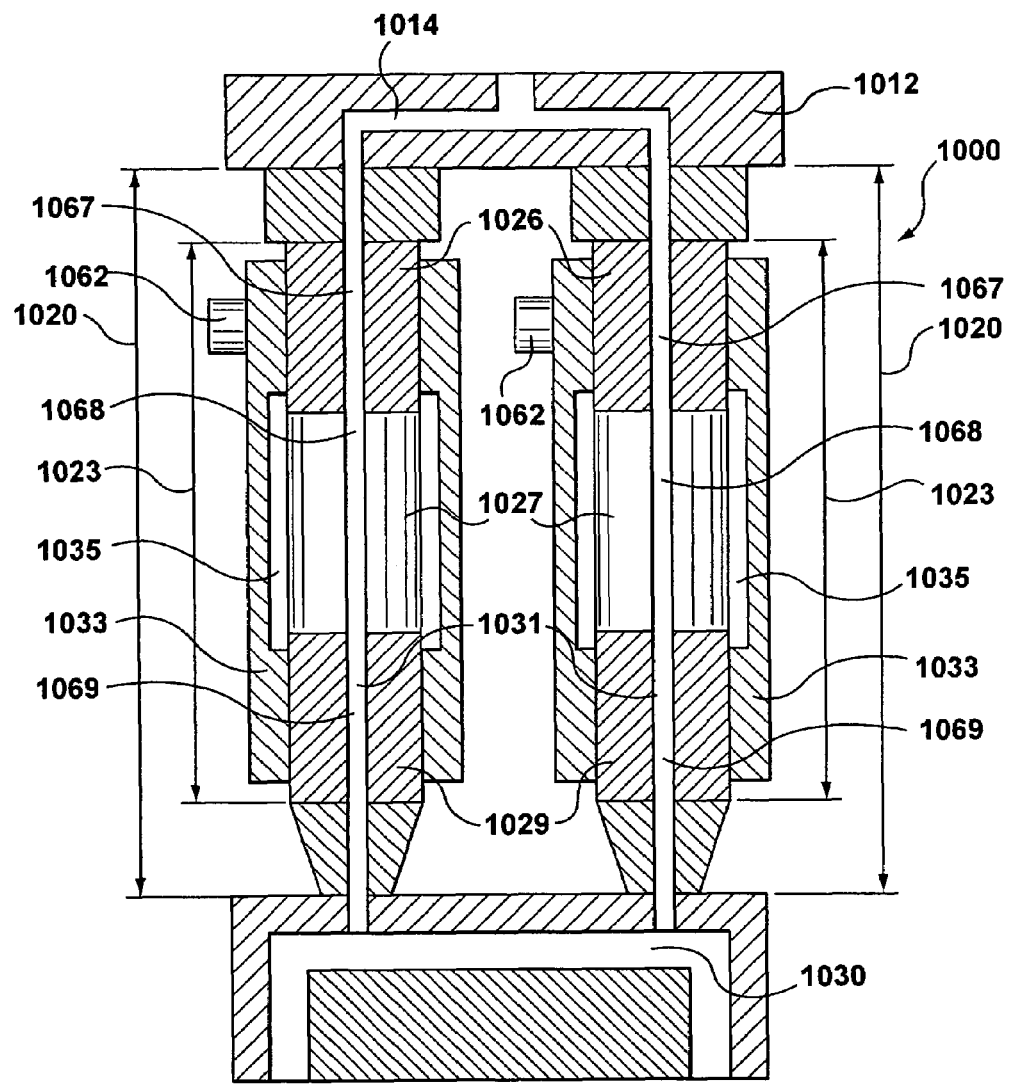
FIG. 10 is a side view partly in section of another embodiment of an injection molding apparatus of the present invention having two nozzles, each having a nozzle body made of multiple nozzle body segments, and a heater sleeve surrounding the nozzle body.

Nozzle 20a includes nozzle heaters 60a and 64a, embedded into nozzle body segments 26a and 29a, respectively, as well as electrical connections 62a and 66a, which are connected to nozzle heaters 60a and 64a, respectively. Although the nozzle heaters 60a and 64a shown in this embodiment are spiral heaters embedded in an exterior surface of the nozzle body segments, other means for heating could be used. For example, heaters 60a and 64a could comprise heating elements embedded into a sleeve(s) (such as shown in FIG. 10 discussed below), heating rods embedded into the nozzle body segments, or cartridge heaters, as would be apparent to one skilled in the relevant art. Nozzle 20a also includes thermocouples for monitoring the temperature of each of the nozzle body segments 26a, 27a and 29a, such as thermocouples 76 shown embedded into nozzle body segments 26a, 27a, and 29a in FIG. 2. A controller (not shown) is coupled to each of the thermocouples 76 and is used to control nozzle heaters 60a, 64a.

A collar 74 surrounds a portion of upstream end 46a of upstream nozzle body segment 26a to position and align the upstream nozzle body segment 26a and thus nozzle 20a with respect to manifold 12a, pin support 92 and mold gate 58a. A lower surface 75 of the collar 74 abuts a shoulder 78 provided in opening 133a of the split mold plate 34a to locate the sleeve relative to the mold plate 134a. The collar 74 is made of a material having a low thermal conductivity, for example titanium or ceramic, to act as an insulator to generally prevent heat transfer from upstream nozzle body segment 26a to mold plate 134a. Collar 74 also includes a cavity 77 to limit the contact between the lower surface 75 of the collar 74 and shoulder 78 of mold plate 134a, thus reducing the heat loss from upstream nozzle body segment 26a even further. Collar 74 also includes an opening 79 through which leads for electrical connectors 62a and 66a extend to be externally connected to a power source (not shown).

Mold plates 134a, 234a and 334a are pressed and held together during the molding process by bolts 35. In an alternative embodiment, the bolts 35 are releasable to eject molded articles from mold cavities that are provided between the mold plates 134a, 234a, 334a. For example, one manifold 12a may inject melt into different mold cavities that are provided between mold plates 134a and 234a and/or mold plates 234a and 334a, simultaneously. In such an arrangement, shorter nozzles would be provided to communicate with the mold cavities located closer to the manifold 12a. This arrangement facilitates the production of more or larger molded articles with a single manifold 12a. Split mold plate 34a may have more or less mold plates forming a variety of configurations in an injection molding apparatus of the present invention, as would be apparent to one skilled in the art.

As shown in FIG. 2, the intermediate nozzle body segment 27a does not include a separate heater. Instead, the intermediate nozzle body segment 27a is heated substantially through contact with the upstream and downstream nozzle body segments 26a and 29a, which are heated by heaters 60a and 64a, respectively. Because the intermediate nozzle body segment 27a does not directly contact the split mold plate 34a, the intermediate nozzle body segment does not loose heat as quickly as the upstream and downstream nozzle body segments 26a, 29a. Therefore, the intermediate nozzle body segment 27a receives sufficient heat from the upstream and downstream nozzle body segments 26a, 29a to maintain the intermediate nozzle body segment 27a at a desired temperature.

In an alternative embodiment, the intermediate nozzle body segment 27a is provided with a conductive outer layer, such as a sleeve or coating. The conductive outer layer improves the efficiency of heat distribution along the length of the intermediate nozzle body segment 27a. The conductive outer layer may be comprised of copper, copper alloy or any other suitable conductive material. In one embodiment, the conductive layer may be applied by spraying or dipping the conductive material directly onto the intermediate nozzle body segment 27a.

In operation, melt is injected from the machine nozzle into the manifold channel 14a. The manifold channel 14a distributes the melt to a plurality of nozzle channels, including nozzle channel 31a of nozzle 20a. Melt is delivered from the nozzle channel 31a to the mold cavity through mold gate 58a. During the injection process, the melt is maintained at a generally uniform temperature as it travels through the upstream, intermediate and downstream nozzle body segments 26a, 27a and 29a of the nozzle 20a. The generally uniform temperature of nozzle 20a is maintained because the heaters 60a, 64a of nozzles body segments 26a and 29a, respectively, are independently controlled. By controlling the heaters 60a and 64a independently, more heat may be applied to the nozzle body segment 26a or 29a that experiences greater heat loss due to contact with the cold split mold plate 34a. The intermediate nozzle body segment 27a absorbs heat from the upstream and downstream nozzle body segments 26a and 29a. A more even distribution of the heat along the intermediate nozzle body segment 27a may be achieved by using a conductive outer layer.

Referring to FIG. 3, another embodiment of an injection molding apparatus 10b is shown. This embodiment is similar to the embodiment of FIG. 2, with the addition of a conductive sleeve 106 surrounding intermediate nozzle body segment 27b of nozzle body 23b of nozzle 20b as an alternate conductive layer. The conductive sleeve 106 is in direct contact with an outer surface 108 of the intermediate nozzle body segment 27a. Similar to the conductive outer layer described in relation to FIG. 2, the conductive sleeve 106 functions to distribute the heat transferred from upstream and downstream nozzle body segments 26b, 29b along the length of the intermediate nozzle body segment 27b. The conductive sleeve 106 is comprised of copper, copper alloy or another suitable conductive material.

Another embodiment of a nozzle 20c is shown in FIG. 4. The nozzle 20c of FIG. 4 has a nozzle body 23c with an upstream nozzle body segment 26c, an intermediate nozzle body segment 27c and a downstream nozzle body segment 29c. Nozzle 20c is similar to the nozzle 20b of FIG. 3, however, nozzle 20c further includes a tool engaging projection 110. The tool engaging projection 110 is coupled to the intermediate nozzle body segment 27c, through conductive sleeve 106c, by fasteners 112. The fasteners 112 may be threaded, as shown, or alternatively, the fasteners 112 may be another suitable type of fastener. If desired, the tool engaging projection 110 may be coupled only to the conductive sleeve 106c.

Referring to FIG. 5, another embodiment of a nozzle 20d is shown. Nozzle 20d is similar to nozzle 20c of FIG. 4 however, tool engaging projection 110d is coupled to an outer surface 114 of conductive sleeve 106d by brazing or soldering. Further, the tool engaging projection 110d is located generally midway along the conductive sleeve 106d. This allows for an uninterrupted flow of heat from upstream nozzle body segment 26d to intermediate nozzle body segment 27d of nozzle body 23d, as indicated by arrow 107 in FIG. 5A. Similarly, there is an uninterrupted flow of heat from downstream nozzle body segment 29d to intermediate nozzle body segment 27d of nozzle body 23d, as indicated by arrow 109 in FIG. 5B.

In an alternative embodiment, an insulative layer, such as a coating (not shown), is applied over the thermally conductive outer layer. For example, an insulative layer could be applied over conductive sleeve 106, 106c, 106d of any of the previous embodiments. The insulative layer provides thermal insulation, so as to minimize radiant heat loss from the intermediate nozzle body to the ambient. The insulative layer is constructed from a low thermally conductive material to provide thermal insulation and to avoid heat loss radiating from the intermediate nozzle body to the ambient. Examples of suitable insulative layer materials are described in U.S. Provisional Application No. 60/460,417, which is incorporated herein by reference in its entirety. Suitable insulative layer materials include ceramics such as alumina (Al2O3), silicon nitride (Si3N4), or silicon carbide (SiC) and a bi-axially oriented material, such as liquid crystal polymer, for example. The insulative layer may also be constructed from a ceramic-coated aeromet tube.

Another embodiment of a nozzle 20e is shown in FIG. 6. In this embodiment, intermediate nozzle body 27e includes a conductive layer 116 that surrounds the intermediate portion of nozzle channel 31e of nozzle body 23e. The conductive layer 116 may be a sleeve that is inserted into the nozzle channel 31e or alternatively, the conductive layer 116 may be a coating that is applied directly to an inner surface 118 of the nozzle channel 31e. The conductive layer may be comprised of copper, copper alloy or another suitable conductive material. The conductive layer 116 functions in a similar manner as the conductive sleeve 106, 106c, 106d of the previous embodiments to distribute the heat transferred from the upstream and downstream nozzle body segments 26e, 29e along the length of the intermediate nozzle body segment 27e.

Another embodiment of a nozzle 20f is shown in FIG. 7. In this embodiment, intermediate nozzle body 27f includes an alternate conducting means that includes conductive rods 120 disposed longitudinally through intermediate nozzle body segment 27f of nozzle body 23f. The conductive rods 120 may be comprised of copper, copper alloy or another suitable conductive material. The conductive rods 120 function in a similar manner as the conductive sleeve 106, 106c, 106d of the previous embodiments to distribute the heat transferred from the upstream and downstream nozzle body segments 26f, 29f along the length of the intermediate nozzle body segment 27f.

Figure 8:
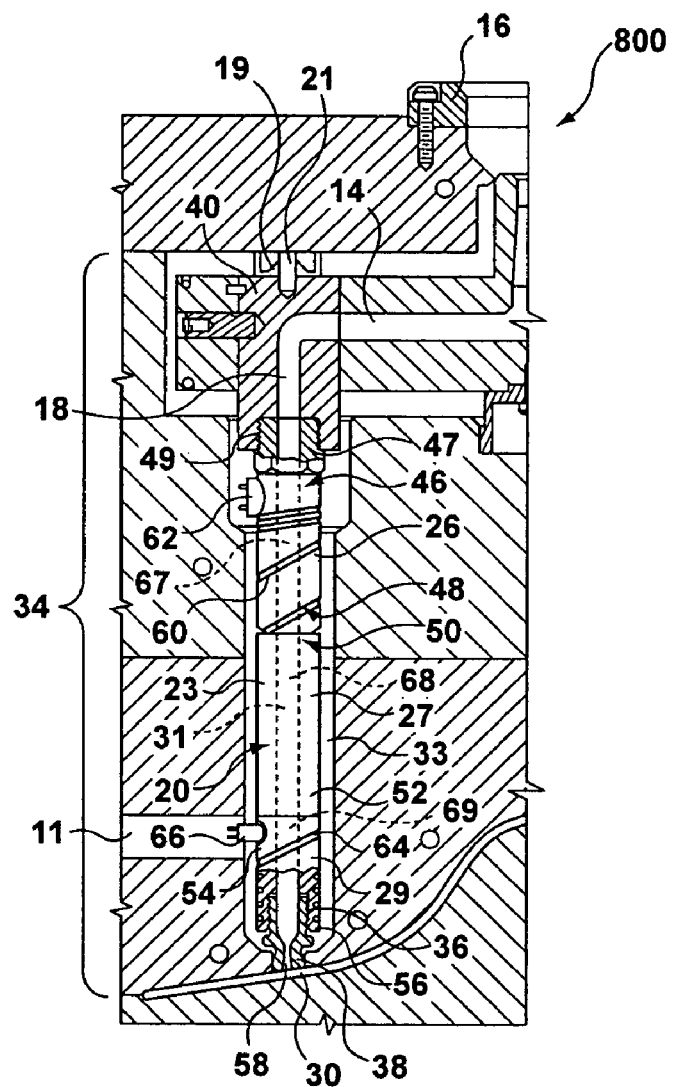
FIG. 8 is a side view partly in section of another embodiment of an injection molding apparatus of the present invention having a nozzle with a nozzle body made of multiple nozzle body segments.

FIG. 8 shows a portion of another embodiment of an injection molding apparatus 800 that is similar to injection molding apparatus 10 of FIG. 1, except that in this embodiment, a nozzle head 47 is connected to the manifold 12 via a threaded connection 49. In particular, the nozzle head 47, which is located at upstream end 46 of upstream nozzle body segment 26 adjacent manifold 12, is coupled to a manifold plug 40 via threaded connection 49.

Figure 9:
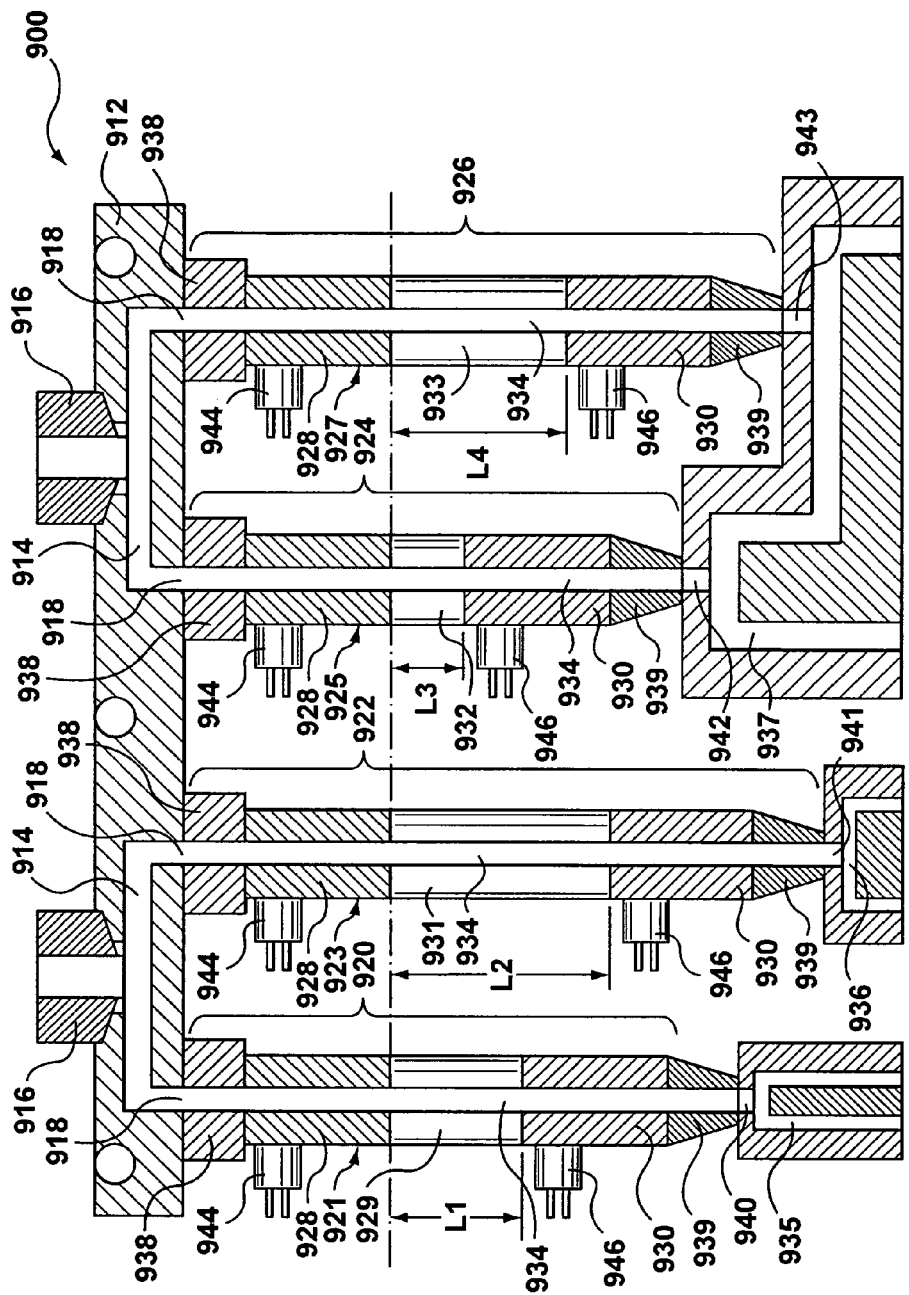
FIG. 9 is a side view partly in section of another embodiment of an injection molding apparatus of the present invention having four nozzles of varying length.

FIG. 9 shows an embodiment of the present invention in use in a family mold. A family mold is a mold in which more than one component of a multi-component product are molded concurrently in the same mold in separate mold cavities. FIG. 9 shows an injection molding system 900 including a manifold 912 having two manifold channels 914 extending therethrough. Two manifold bushings 916 are located at inlet of each manifold channel 914 to receive a melt stream of moldable material from machine nozzles (not shown) and to deliver the melt stream to manifold outlets 918. A heating element (not shown) heats manifold 912 to maintain the melt streams passing through manifold channels 914 at a desired temperature. The heating element of the manifold may be embedded into or otherwise surround a surface of the manifold 912.

Injection molding apparatus 900 has four nozzles, including a first nozzle 920, a second nozzle 922, a third nozzle 924 and a fourth nozzle 926. Each nozzle 920, 922, 924 and 926 includes a respective nozzle body 921, 923, 925 and 927 made of three nozzle body segments. First nozzle body 921 is made of an upstream nozzle body segment 928, an intermediate nozzle body segment 929 and a downstream nozzle body segment 930. Second nozzle body 923 has upstream nozzle body segment 928, an intermediate nozzle body segment 931 and downstream nozzle body segment 930. Third nozzle body 925 has upstream nozzle body segment 928, an intermediate nozzle body segment 932 and downstream nozzle body segment 930. Finally, fourth nozzle body 927 has upstream nozzle body segment 928, intermediate nozzle body segment 933 and downstream nozzle body segment 930. As shown, the intermediate nozzle body segments 929, 931, 932 and 933 for each nozzle body are a different length L1, L2, L3 and L4, such that the length of the nozzle bodies 921, 923, 925 and 927 varies, respectively.

The nozzle body segments of each nozzle define a nozzle channel 934 that delivers melt streams from manifold outlets 918 to various mold cavities. Specifically, the melt channel 934 of first nozzle 920 delivers a melt stream to a first mold cavity 935. The melt channel 934 of second nozzle 922 delivers a melt stream to a second mold cavity 936. Finally, the melt channels 931 of third nozzle 924 and fourth nozzle 926 deliver melt streams to a third mold cavity 937. A nozzle head 938 for each nozzle 920, 922, 924 and 926 is adjacent the manifold 912. A nozzle tip 939 of nozzle 920 is adjacent a mold gate 940 leading to first mold cavity 935. A nozzle tip 939 of nozzle 922 is adjacent a mold gate 941 leading to second mold cavity 936. Nozzle tips 939 of nozzles 924 and 926 are adjacent mold gates 942 and 943, respectively, leading to third mold cavity 937. In this embodiment, upstream nozzle body segments 928 are each in contact with and directly or actively heated by a nozzle heater (not shown), which is powered through an electrical connector 944. Similarly, downstream nozzle body segments 930 are each in contact with and directly or actively heated by a nozzle heater (not shown), which is powered through an electrical connector 946.

Intermediate nozzle body segments 929, 931, 932 and 933 are used to vary the length of nozzle bodies 921, 923, 925 and 927, and thereby nozzles 920, 922, 924 and 926. Intermediate nozzle body segments 929, 931, 932 and 933 are substantially devoid of a nozzle heater in direct contact with them. That is, intermediate nozzle body segments 929, 931, 932 and 933 are not directly or actively heated by a separate nozzle heater. Rather, any heat that may be transferred to intermediate nozzle body segments 929, 931, 932 and 933 is passed substantially indirectly through upstream and downstream nozzle body segments 928 and 930. As such, intermediate nozzle body segments 929, 931, 932 and 933 are heated substantially passively through heat transfer from upstream and downstream nozzle body segments 928 and 930.

Similar to the embodiment discussed above with respect to FIG. 1, upstream nozzle body segment 928 can be connected to the respective intermediate nozzle body segments 929, 931, 932 and 933 by a threaded engagement, a press fit engagement, an interference fit engagement, brazing, welding or fusing. Similarly, downstream nozzle body segment 930 can be connected with the respective intermediate nozzle body segments 929, 931, 932 and 933 by a threaded engagement, a press fit engagement, an interference fit engagement, brazing, welding or fusing. The means for connecting the intermediate nozzle body segments to upstream and downstream nozzle body segments is such that there is no relative movement, for example sliding movement, between the nozzle body segments. As such, during use, if one nozzle body segment moves due to thermal expansion, the other nozzle body segments connected thereto also move.

FIG. 10 shows another embodiment of an injection molding apparatus 1000 of the present invention. Apparatus 1000 includes two nozzles 1020, each positioned between a manifold 1012 and a mold cavity 1030. Nozzles 1020 each include a nozzle body 1023 made of three nozzle body segments: an upstream nozzle body segment 1026, an intermediate nozzle body segment 1027 and a downstream nozzle body segment 1029, for delivering a melt stream from a manifold channel 1014 to mold cavity 1030. As in the previous embodiments, intermediate nozzle body segment 1027 can be of varying length such that it is used to vary the length of nozzle body 1023, and thereby nozzle 1020. Intermediate nozzle body segment 1027 is also substantially devoid of a nozzle heater in direct contact with it. Intermediate nozzle body segment 1027 is disposed between the upstream nozzle body segment 1026 and the downstream nozzle body segment 1029. The nozzle body segments 1026, 1027 and 1029 define a nozzle channel 1031, which is in fluid communication with the manifold channel 1014 of the manifold 1012.

Apparatus 1000 includes heater sleeves 1033 disposed about each nozzle 1020 and connected to a nozzle heater (not shown). In one embodiment, the nozzle heater is embedded into and along the length of each sleeve 1033. An electrical connector 1062 is connected to the nozzle heater. Nozzles 1020 and/or sleeves 1033 may also include thermocouples (not shown) for monitoring the temperature of each of the nozzle body segments 1026, 1027 and 1029, and for controlling the nozzle heaters. Sleeves 1033 are preferably made of a material having relatively high thermal conductivity so that heat from the nozzle heater is transferred through sleeves 1033 to the underlying nozzles 1020. Sleeves 1033 each have a cut-out 1035 adjacent intermediate nozzle body segments 1027 so that the sleeves 1033 do not come in direct contact with segments 1027. The cut-outs 1035 provide an air gap between each sleeve 1033 and segment 1027. The air acts as an insulator so that the heat from heater sleeves 1033 is not transferred to intermediate nozzle body segments 1027.

Figure 11:
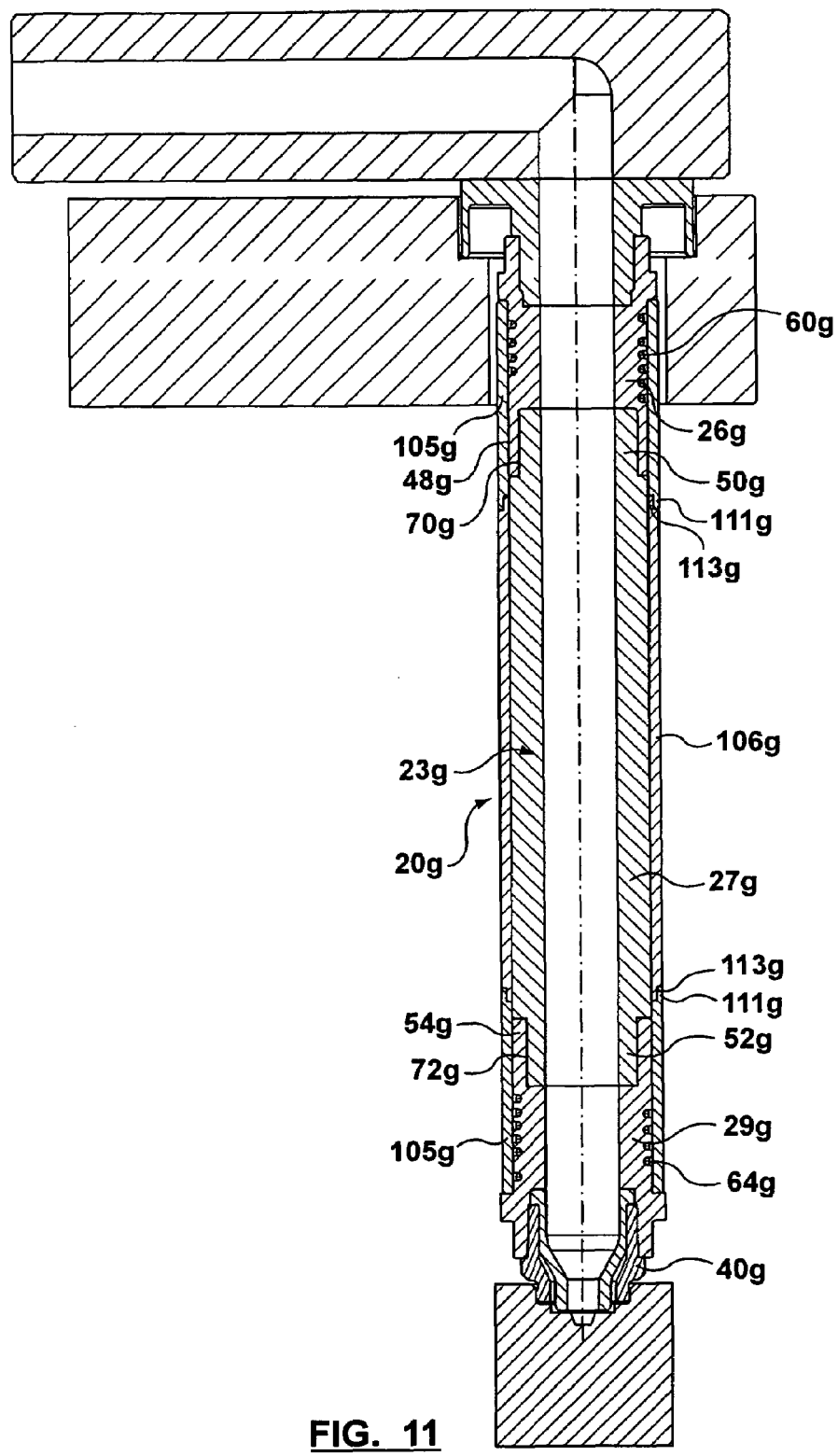
FIG. 11 is a side sectional view of another embodiment of a nozzle having a nozzle body made of multiple nozzle body segments.

Another embodiment of a nozzle 20g is shown in FIG. 11. In this embodiment, nozzle 20g has a nozzle body 23g with an intermediate nozzle body segment 27g and two standard nozzle body segments used as an upstream nozzle body segment 26g and a downstream nozzle body segment 29g. Upstream nozzle body segment 26g and downstream nozzle body segment 29g are heated by heaters 60g and 64g that are embedded. An upstream end 50g of intermediate nozzle body segment 27g is connected to a downstream end 48g of upstream nozzle body segment 26g by a threaded engagement 70g, and a downstream end 52g of intermediate nozzle body segment 27g is connected to an upstream end 54g of downstream nozzle body segment 29g by a threaded engagement 72g. The length of intermediate nozzle body segment 27g may be selected to construct a nozzle 20g of any desired overall length.

A retaining sleeve 105g is disposed about each of upstream nozzle body segment 26g and downstream nozzle body segment 29g and is constructed to have a thermal expansion rate close to that of upstream nozzle body segment 26g and downstream nozzle body segment 29g. A conductive sleeve 106g is disposed about intermediate body segment 27g and is connected to each retaining sleeve 105g by a shoulder interface. The shoulder interface is created by a shoulder 111g on each of retaining sleeves 105g that is configured to compliment a shoulder 113g on each end of conductive sleeve 106g. In this embodiment, shoulder 111g and shoulder 113g are configured such that conductive sleeve 106g is located radially inward from retaining sleeve 105g at the shoulder engagement. Conductive sleeve 106g is comprised of copper, copper alloy, tin or another suitable conductive material. Retaining sleeves 105g are comprised of steel, tin or another suitable conductive material.

The shoulder engagement of retaining sleeves 105g with conductive sleeve 106g functions to control the thermal expansion of conductive sleeve 106g with respect to nozzle body 23g. For example, in embodiments where intermediate nozzle body 27g has a lower thermal expansion rate than conductive sleeve 106g, retaining sleeves 105g can be configured to expand at a rate similar to intermediate nozzle body 27g so the shoulder engagement would limit the ability of conductive sleeve 106g to separate from intermediate nozzle body 27g due to thermal expansion.

Nozzle 20g includes a modular construction wherein a standard segment is used for upstream nozzle body segment 26g and downstream nozzle body segment 29g, making them interchangeable. In this embodiment, threaded engagement 70g and threaded engagement 72g are both configured such that intermediate nozzle body segment 27g provides the male threaded surface while each of upstream nozzle body segment 26g and downstream nozzle body segment 29g provides the female threaded surface.

Figure 12:
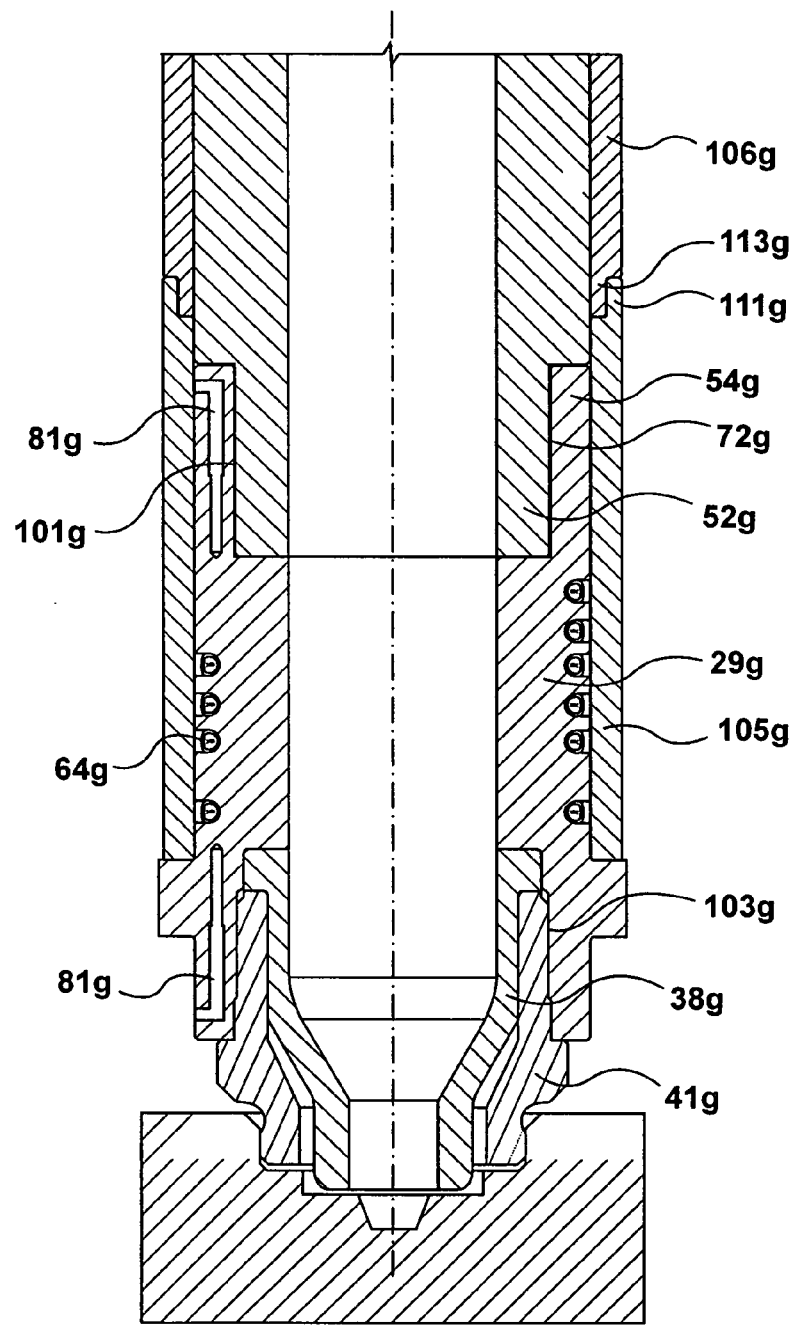
FIG. 12 is a side sectional view of a portion of the nozzle shown in FIG. 11.

A downstream portion of nozzle 20g is shown in greater detail in FIG. 12. Downstream nozzle body segment 29g includes two female threaded surfaces 101g, 103g. The upstream threaded surface 101g forms a portion of threaded engagement 72g and downstream threaded surface 103g engages a tip retainer 41g that connects a nozzle tip 38g to downstream nozzle body segment 29g. Downstream nozzle body segment 29g further includes thermocouple tubes 81g. Multiple thermocouple tubes 81g may be provided, as shown, so that thermocouples (not shown) may be placed at various locations along the length of nozzle 20g.

Figure 13:
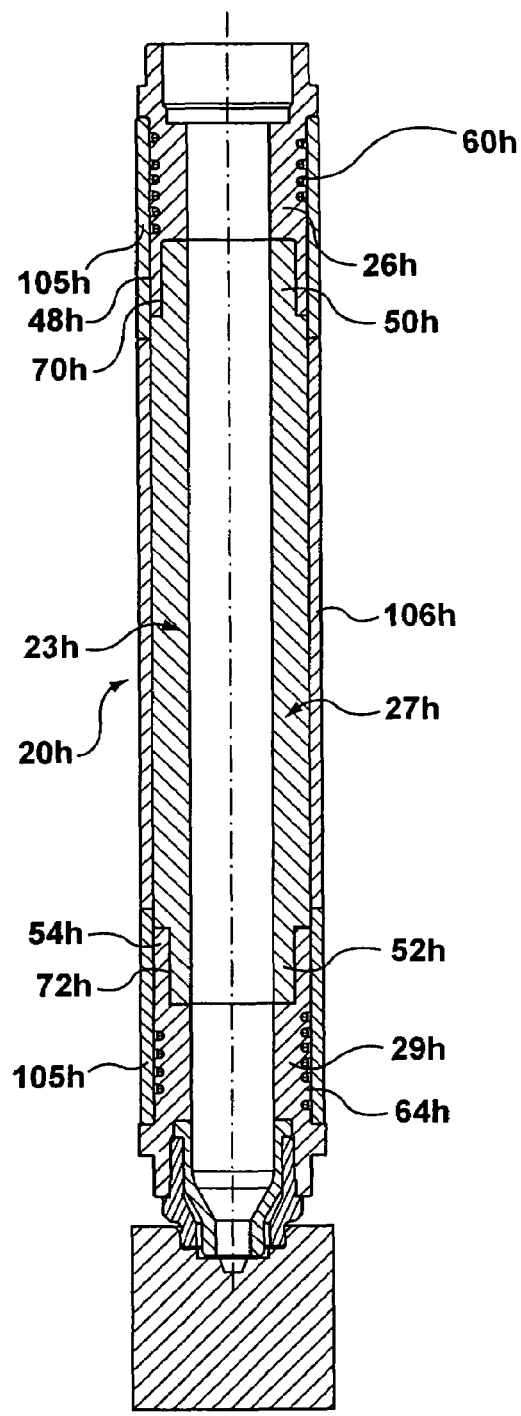
FIG. 13 is a side sectional view of another embodiment of a nozzle having a nozzle body made of multiple nozzle body segments.

Another embodiment of a nozzle 20h is shown in FIG. 13. Nozzle 20h is similar to nozzle 20g of FIG. 11 in that it includes a nozzle body 23h with a standard upstream nozzle body segment 26h, an intermediate nozzle body segment 27h, a standard downstream nozzle body segment 29h, and embedded heaters 60h and 64h. In this embodiment, however, a conductive sleeve 106h is disposed about intermediate body segment 27h and abuts each of a pair of retaining sleeves 105h. Heat from each of upstream nozzle body segment 26h and downstream body segment 29h can transfer to each of the respective retaining sleeves 105h. The abutment of retaining sleeves 105h with conductive sleeve 106h utilizes frictional forces to retain conductive sleeve 106h when the expansion rate of conductive sleeve 106h differs from retaining sleeves 105h. The contact between conductive sleeve 106h and retaining sleeves 105h also creates an uninterrupted flow of heat from upstream nozzle body segment 26h and downstream nozzle body segment 29h to conductive sleeve 106h which further transfers heat to intermediate body portion 27h.

Figure 14:
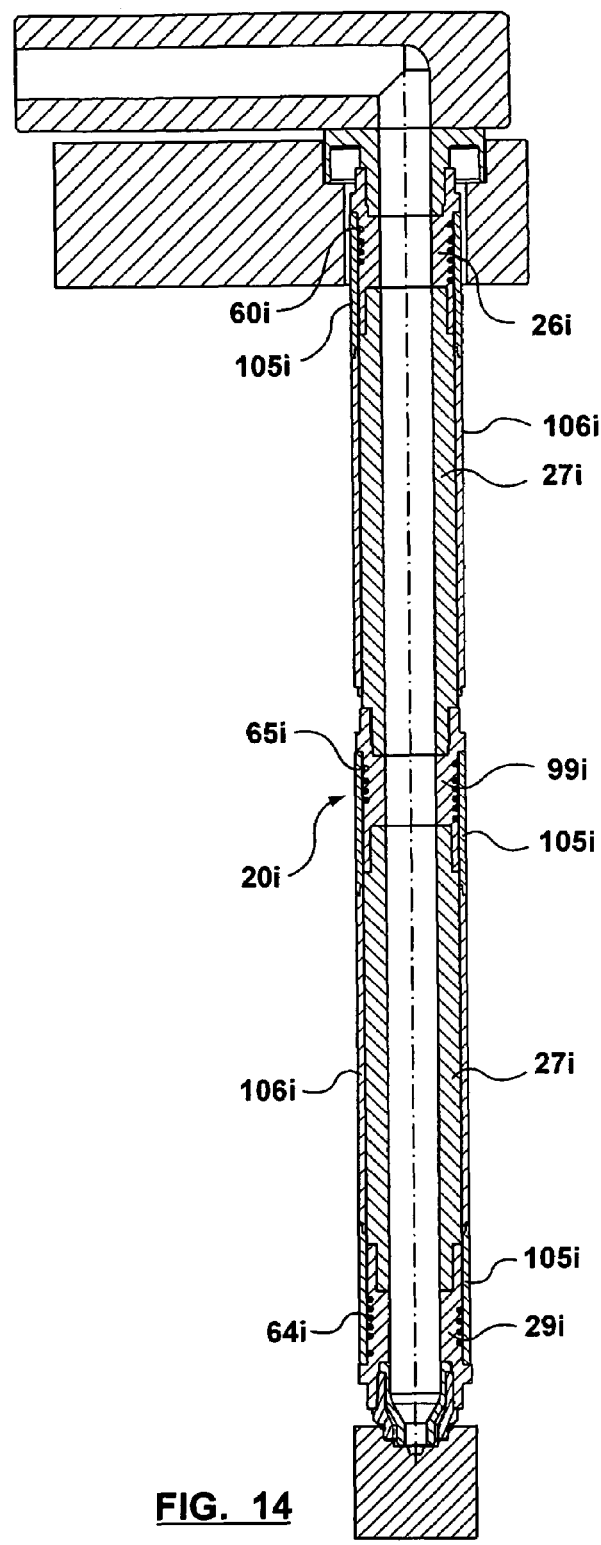
FIG. 14 is a side sectional view of another embodiment of a nozzle having a nozzle body made of multiple nozzle body segments.

Another embodiment of a nozzle 20i is shown in FIG. 14. Nozzle 20i is similar to nozzle 20g of FIG. 11, however, two additional body segments are included. Nozzle 20i includes, in addition to the heated standard segments used as an upstream nozzle body segment 26i and a downstream nozzle body segment 29i, a pair of intermediate nozzle body segments 27i, a pair of conductive sleeves 106i, an additional heated standard nozzle body segment 99i, and multiple retaining sleeves 105i. Each of the upstream nozzle body segment 26i, downstream nozzle body segment 29i and standard nozzle body segment 99i are heated by an embedded heater 60i, 64i and 65i, respectively. Standard nozzle body segment 99i is interposed between the pair of intermediate nozzle body segments 27i and is connected to each of the pair of intermediate nozzle body segments 27i by a threaded engagement. In this embodiment, standard nozzle body segment 99i is configured to be interchangeable with upstream nozzle body segment 26i or downstream nozzle body segment 29i so that nozzle 20i may be easily extended. Although conductive sleeves 106i and retaining sleeves 105i are shown connected by shoulder engagements, it should be appreciated that any interface, such as an abutting connection, could be included.

Figure 15:
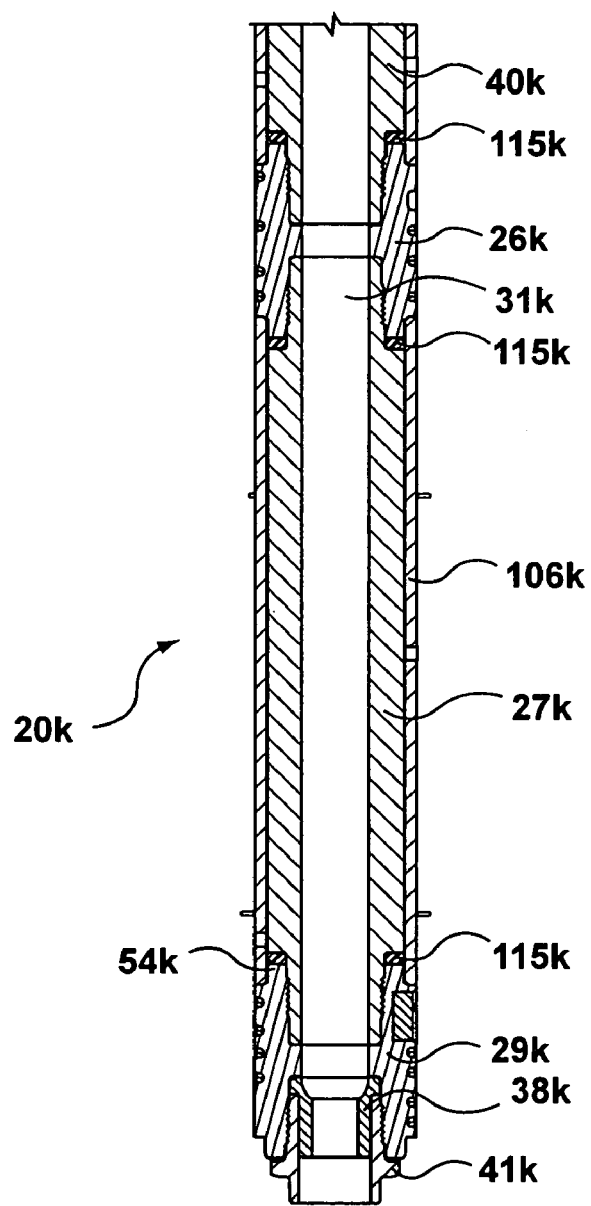
FIG. 15 is a side sectional view of a portion of another embodiment of a nozzle having a nozzle body made of multiple nozzle body segments.

In another embodiment, a nozzle 20k, a downstream portion of which is shown in FIG. 15, includes a manifold plug 40k, a heated standard upstream nozzle body segment 26k, a standard heated downstream nozzle body segment 29k, an intermediate nozzle body segment 27k, a conductive sleeve 106k, and conductive washers 115k. Nozzle 20k also includes a nozzle tip 38k that is retained within nozzle body segment 29k by a tip retainer 41k. Unlike nozzle 20i, however, nozzle 20k does not include retaining sleeves disposed over heated segments 26k and 29k. Conductive sleeves 106k interface with the adjacent nozzle body segments 26k and 29k with abutting connections and are held in place by compressive forces therebetween.

Conductive washers 115k are sandwiched between adjacent nozzle body segments. For example, conductive washers 115k are sandwiched between an upstream end of nozzle body segment 26k and the adjacent manifold plug 40k and between a downstream end of nozzle body segment 26k and the adjacent intermediate nozzle body segment 27k. Another conductive washer 115k is sandwiched between an upstream end 54k of nozzle body segment 29k and the adjacent intermediate nozzle body segment 27k.

Conductive washers 115k may be made of a material that is less stiff than the adjacent segments so that it is compressible when the adjacent segments are coupled. The compressibility protects each of the adjacent segments because during thermal expansion the washer can crush first. The compressibility of washers 115k also helps to increase the contact between each washer 115k and the adjacent parts, therefore providing better heat conduction between adjacent parts while allowing the adjacent parts to seal properly to each other. For example, nozzle body segments 26k and 27k seal against each other to provide a continuous melt channel 31k and washer 115k is compressed between a downstream end of segment 26k and a shoulder on the upstream portion of segment 27k.

The material of conductive washers 115k may also be chosen to have a high thermal conductivity. For example, conductive washers 115k may be constructed from copper, brass, aluminum or any other material known to a person having skill in the relevant art. The adjacent segments may be designed so that conductive washers 115k are compressed or crushed after assembly. Additionally, conductive washers 115k can be conductive spring washers that compress when the adjacent segments are coupled.

Figure 16:
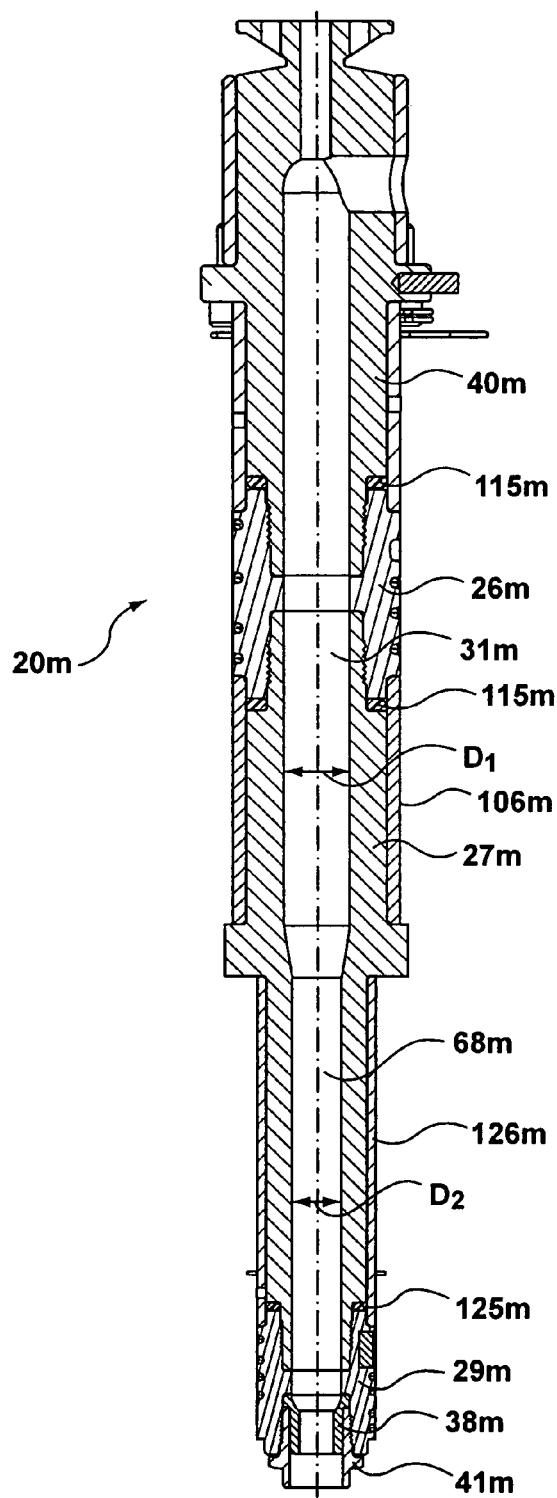
FIG. 16 is a side sectional view of another embodiment of a nozzle having a nozzle body made of multiple nozzle body segments.
Figure 17:
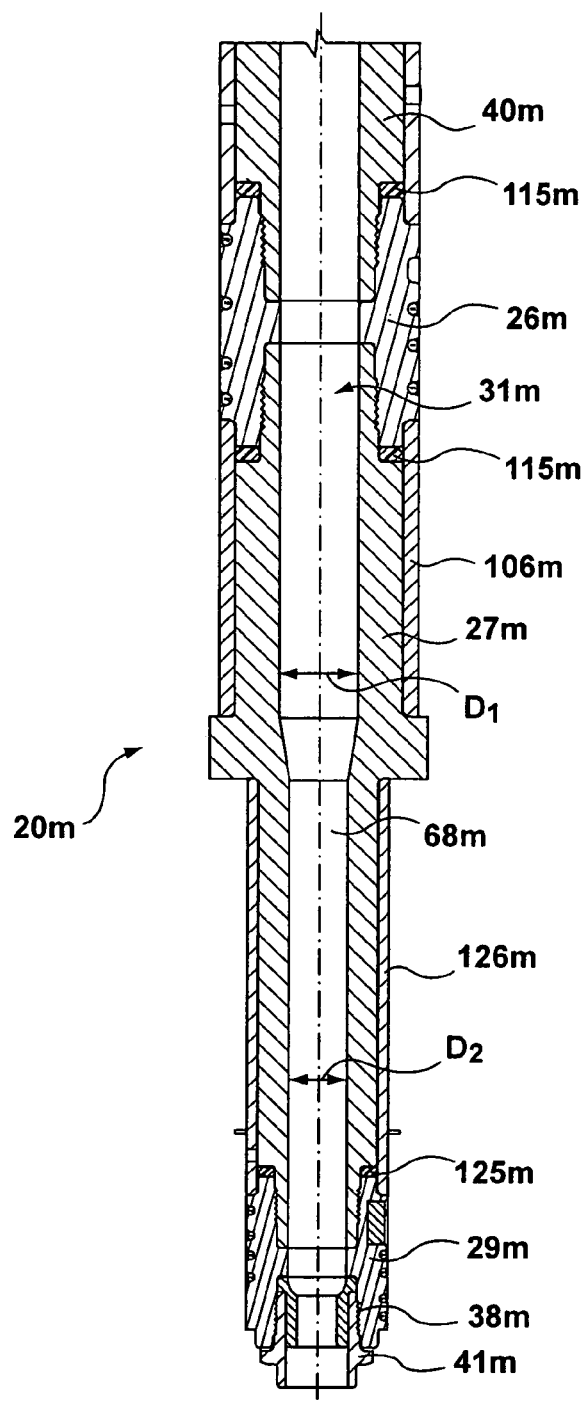
FIG. 17 is a side sectional view of a portion of the nozzle shown in FIG. 16.

FIGS. 16 and 17 illustrate another embodiment, nozzle 20m. Similar to nozzle 20 of FIG. 8, nozzle 20m includes a manifold plug 40m, an upstream nozzle body segment 26m, an intermediate nozzle body segment 27m and a downstream nozzle body segment 29m that form a continuous melt channel 31m. Conductive sleeves 106m, 126m and conductive washers 115m, 125m are also provided to improve heat conduction. Intermediate nozzle body segment 27m includes an intermediate melt channel 68m that transitions from a first diameter D1 to a second smaller diameter D2.

In nozzle 20m, the outer diameter of intermediate nozzle body segment 27m is larger in the portion where melt channel 68m has diameter D1 and smaller in the portion where melt channel 68m has diameter D2. As a result, conductive sleeves 106m and 126m have different diameters to match the diameter of nozzle body segment 27m. In addition, conductive washers 115m and 125m have different diameters to match the differing outer diameters of nozzle 20m along its length. As a further result of the varying outer diameter of nozzle 20m, upstream nozzle body segment 26m and downstream nozzle body segment 29m are not identical standard parts. Rather, downstream nozzle body segment 29m is smaller than upstream nozzle body segment 26m to match the outer diameter of nozzle 20m at its downstream portion.

Figure 18:
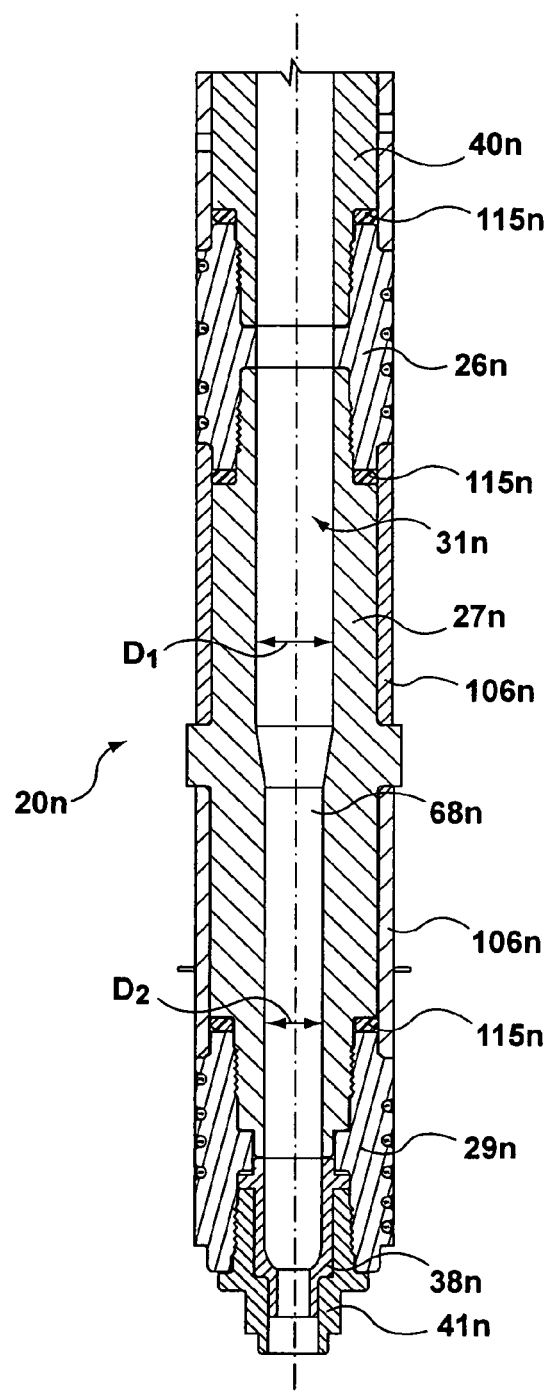
FIG. 18 is a side sectional view of a portion of another embodiment of a nozzle having a nozzle body made of multiple nozzle body segments.

Another embodiment, nozzle 20n, is shown in FIG. 18. Nozzle 20n includes a manifold plug 40n, an upstream nozzle body segment 26n, an intermediate nozzle body segment 27n, a downstream nozzle body segment and a tip 38n that form a continuous melt channel 31n. Tip 38n is coupled to downstream nozzle body segment 29n by a tip retainer 41n. Conductive washers 115n and conductive sleeves 106n are also provided to improve heat conduction between the nozzle body segments. Nozzle 20n is similar to nozzle 20m described above in that intermediate nozzle body segment 27n includes an intermediate melt channel 68m that transitions from a first diameter D1 to a second smaller diameter D2. However, the outer diameter of nozzle body segment 27n does not change along its length resulting in the outer diameter of nozzle 20n not varying along its length. Such a configuration allows for the parts to be standardized. For example, upstream nozzle body segment 26n and downstream nozzle body segment 29n are identical heated nozzle body segments. Similarly, all conductive washers 115n are a standard size and conductive sleeves 106n are a standard size.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
a manifold having a manifold channel;
a nozzle having a nozzle body including an upstream nozzle body segment having an upstream melt channel, an intermediate nozzle body segment having an intermediate melt channel, and a downstream nozzle body segment having a downstream melt channel, said intermediate nozzle body segment disposed between said upstream nozzle body segment and said downstream nozzle body segment such that said upstream melt channel, intermediate melt channel and downstream melt channel collectively define a nozzle channel in fluid communication with said manifold channel; and
means for connecting said intermediate nozzle body segment with said downstream nozzle body segment such that said intermediate nozzle body segment is not movable relative to said downstream nozzle body segment, wherein said upstream and downstream nozzle body segments are heated and said intermediate nozzle body segment is substantially devoid of a nozzle heater.

2. The injection molding apparatus as claimed in claim 1, further comprising means for conducting heat from said upstream and downstream nozzle body segments along the length of said intermediate nozzle body segment.

3. The injection molding apparatus as claimed in claim 2, wherein said means for conducting comprises a thermally conductive layer covering at least a portion of said intermediate nozzle body segment.

4. The injection molding apparatus as claimed in claim 3, wherein said thermally conductive layer comprises a coating covering at least a portion of said intermediate nozzle body segment.

5. The injection molding apparatus as claimed in claim 3, wherein said thermally conductive layer is a sleeve.

6. The injection molding apparatus as claimed in claim 2, further comprising a coating layer covering said means for conducting.

7. An injection molding apparatus as claimed in claim 6, wherein said coating layer is comprised of ceramic.

8. The injection molding apparatus as claimed in claim 1, further comprising:
a first thermocouple coupled to said upstream nozzle body segment; and
a second thermocouple coupled to said downstream nozzle body segment.

9. The injection molding apparatus as claimed in claim 8, further comprising:
a third thermocouple coupled to said intermediate nozzle body segment.

10. An injection molding apparatus comprising:
a manifold having a manifold channel;
a nozzle having a nozzle body including an upstream nozzle body segment having an upstream melt channel, an intermediate nozzle body segment having an intermediate melt channel, and a downstream nozzle body segment having a downstream melt channel, said intermediate nozzle body segment disposed between said upstream nozzle body segment and said downstream nozzle body segment such that said upstream melt channel, intermediate melt channel and downstream melt channel collectively define a nozzle channel in fluid communication with said manifold channel
means for connecting said intermediate nozzle body segment with said downstream nozzle body segment, wherein said upstream and downstream nozzle body segments are heated and said intermediate nozzle body segment is substantially devoid of a nozzle heater; and
a plurality of copper rods disposed longitudinally through said second nozzle body segment for conducting heat from said upstream and downstream nozzle body segments along the length of said intermediate nozzle body segment.

11. An injection molding apparatus as claimed in claim 1, wherein said intermediate nozzle body segment is removably connected to at least one of said upstream nozzle body segment and said downstream nozzle body segment.

12. An injection molding apparatus as claimed in claim 1, wherein said intermediate nozzle body segment is made from a thermally conductive material.

13. The injection molding apparatus as claimed in claim 1, wherein said means for connecting comprises a connection by a threaded engagement, welding, brazing, fusing, a press fit engagement, or an interference fit engagement.

14. A nozzle for use in an injection molding apparatus having a manifold and a mold gate, said nozzle comprising:
a nozzle body including
a first nozzle body segment disposed adjacent said manifold having a first melt channel,
a second nozzle body segment having a second melt channel, and
a third nozzle body segment disposed adjacent said mold gate and having a third melt channel, said second nozzle body segment being disposed between said first nozzle body segment and said third nozzle body segment such that said first, second and third melt channels collectively define a nozzle melt channel; and
means for connecting said second nozzle body segment and said third nozzle body segment such that said second nozzle body segment is not slidable relative to said third nozzle body segment, wherein said first and third nozzle body segments are heated and said second nozzle body segment is substantially devoid of a nozzle heater.

15. The nozzle as claimed in claim 14, wherein said second nozzle body segment is removably connected to at least one of said first nozzle body segment and said third nozzle body segment.

16. The nozzle as claimed in claim 14, wherein said second nozzle body segment is made of a thermally conductive material.

17. The nozzle as claimed in claim 14, wherein said means for connecting comprises a connection by a threaded engagement, welding, brazing, fusing, a press fit engagement, or an interference fit engagement.

18. An injection molding apparatus having a mold gate, said apparatus comprising:
 a manifold having a manifold channel; and
 a nozzle having a nozzle body including a first nozzle body segment adjacent said manifold and having a first melt channel, a second nozzle body segment having a second melt channel, and a third nozzle body segment adjacent said mold gate and having a third melt channel, said second nozzle body segment disposed between said first nozzle body segment and said third nozzle body segment such that said first, second and third melt channels collectively define a nozzle melt channel,
 wherein said first and third nozzle body segments are heated and said second nozzle body segment does not have a heater in contact with it, and wherein said second nozzle body segment is connected to said third nozzle body segment and said first nozzle body segment such that a portion of said second nozzle body segment directly contacts said third nozzle body segment and said first nozzle body segment.

19. An injection molding apparatus comprising:
 a manifold having a manifold channel; and
 a nozzle having a nozzle body including an upstream nozzle body segment having an upstream melt channel, an intermediate nozzle body segment having an intermediate melt channel, and a downstream nozzle body segment having a downstream melt channel, said intermediate nozzle body segment disposed between said upstream nozzle body segment and said downstream nozzle body segment such that said upstream melt channel, said intermediate melt channel and said downstream melt channel collectively define a nozzle channel,
 wherein said first and third nozzle body segments are heated and said intermediate nozzle body segment is heated substantially passively, wherein said intermediate nozzle body segment is connected to said downstream nozzle body segment, and wherein an entire upper half of said downstream nozzle body segment is spaced from a mold plate.

20. An injection molding apparatus comprising:
 a manifold having a manifold channel;
 a nozzle having a nozzle body including an upstream nozzle body segment having an upstream melt channel, an intermediate nozzle body segment having an intermediate melt channel, and a downstream nozzle body segment having a downstream melt channel, said intermediate nozzle body segment disposed between said upstream nozzle body segment and said downstream nozzle body segment such that said upstream melt channel, intermediate melt channel and downstream melt channel collectively define a nozzle channel in fluid communication with said manifold channel
 means for connecting said intermediate nozzle body segment with said downstream nozzle body segment, wherein said upstream and downstream nozzle body segments are heated and said intermediate nozzle body segment is substantially devoid of a nozzle heater;
 a heater sleeve disposed around an exterior surface of said nozzle, said heater sleeve in contact with said upstream nozzle body segment and said downstream nozzle body segment and having a cut-out formed therein along substantially the length of said intermediate nozzle body segment; and
 a nozzle heater in contact with said heater sleeve.

21. The injection molding apparatus as claimed in claim 1, further comprising:
 a first mold plate disposed about said upstream nozzle body segment; and
 a second mold plate disposed about said intermediate nozzle body segment.

22. The injection molding apparatus as claimed in claim 21, further comprising:
 a third mold plate disposed downstream of said downstream nozzle body segment.

23. The injection molding apparatus as claimed in claim 22, wherein said second mold plate and said third mold plate define a mold cavity.

24. The injection molding apparatus as claimed in claim 21, wherein said first mold plate and said second mold plate are releasably connected to each other.

25. The injection molding apparatus as claimed in claim 22, wherein said second mold plate and said third mold plate are releasably connected to each other.

26. An injection molding apparatus having a plurality of mold gates, said apparatus comprising:
 a manifold; and
 a plurality of nozzles disposed between said manifold and said mold gates, wherein at least one of the plurality of nozzles has a nozzle body including a first nozzle body segment adjacent said manifold, a second nozzle body segment, and a third nozzle body segment adjacent one of said mold gates, said second nozzle body segment disposed between said first nozzle body segment and said third nozzle body segment, and wherein at least two of said nozzles are of different lengths,
 wherein said first and third nozzle body segments of said at least one nozzle are heated and said second nozzle body segment does not have a heater in contact with it.

27. The injection molding apparatus as claimed in claim 26, wherein said second nozzle body segment of said at least one nozzle is variable in length.

28. The injection molding apparatus as claimed in claim 26, wherein at least two of said nozzles are in fluid communication with separate mold cavities.

29. The injection molding apparatus as claimed in claim 5, further comprising:
 a first retaining sleeve covering at least a portion of said upstream nozzle body segment; and
 a second retaining sleeve covering at least a portion of said downstream nozzle body segment.

30. The injection molding apparatus as claimed in claim 29, wherein said first retaining sleeve and said second retaining sleeve are in abutment with said conductive layer.

31. The injection molding apparatus as claimed in claim 29, wherein said first retaining sleeve and said second retaining sleeve are each connected to said conductive layer by a shoulder engagement.

32. The nozzle as claimed in claim 14, further comprising a fourth nozzle body segment having a fourth melt channel and a fifth nozzle body segment having a fifth melt channel, said fourth nozzle body segment disposed between said third nozzle body segment and said fifth nozzle body segment such that said first, second, third, fourth and fifth melt channels collectively define a nozzle melt channel.

33. The injection molding apparatus as claimed in claim 1, further comprising a conductive washer interposed between said upstream nozzle body segment and said intermediate nozzle body segment.

34. The injection molding apparatus as claimed in claim 1, further comprising a conductive washer interposed between said intermediate nozzle body segment and said downstream nozzle body segment.

35. The injection molding apparatus as claimed in claim 1, wherein said intermediate melt channel has a diameter that varies along the length of said intermediate nozzle body segment.

36. An injection molding apparatus comprising:
a manifold having a manifold channel;
a nozzle having a nozzle body including an upstream nozzle body segment having an upstream melt channel, an intermediate nozzle body segment having an intermediate melt channel, and a downstream nozzle body segment having a downstream melt channel, said intermediate nozzle body segment disposed between said upstream nozzle body segment and said downstream nozzle body segment such that said upstream melt channel, intermediate melt channel and downstream melt channel collectively define a nozzle channel in fluid communication with said manifold channel; and
means for connecting said intermediate nozzle body segment with said downstream nozzle body segment, wherein said upstream and downstream nozzle body segments are heated and said intermediate nozzle body segment is substantially devoid of a nozzle heater, and wherein said intermediate nozzle body segment has a mass or volume that is at least ten percent of the overall nozzle body mass or volume.

* * * * *